April 28, 1931.  C. W. EBELING  1,802,504
SYNCHRONIZED PHOTOGRAPHIC AND SOUND RECORDING AND REPRODUCING MECHANISM
Filed Oct. 29, 1927  3 Sheets-Sheet 1

Inventor
CHARLES W. EBELING
By David Peter Moore
Attorney

April 28, 1931.  C. W. EBELING  1,802,504
SYNCHRONIZED PHOTOGRAPHIC AND SOUND RECORDING AND REPRODUCING MECHANISM
Filed Oct. 29, 1927  3 Sheets-Sheet 2
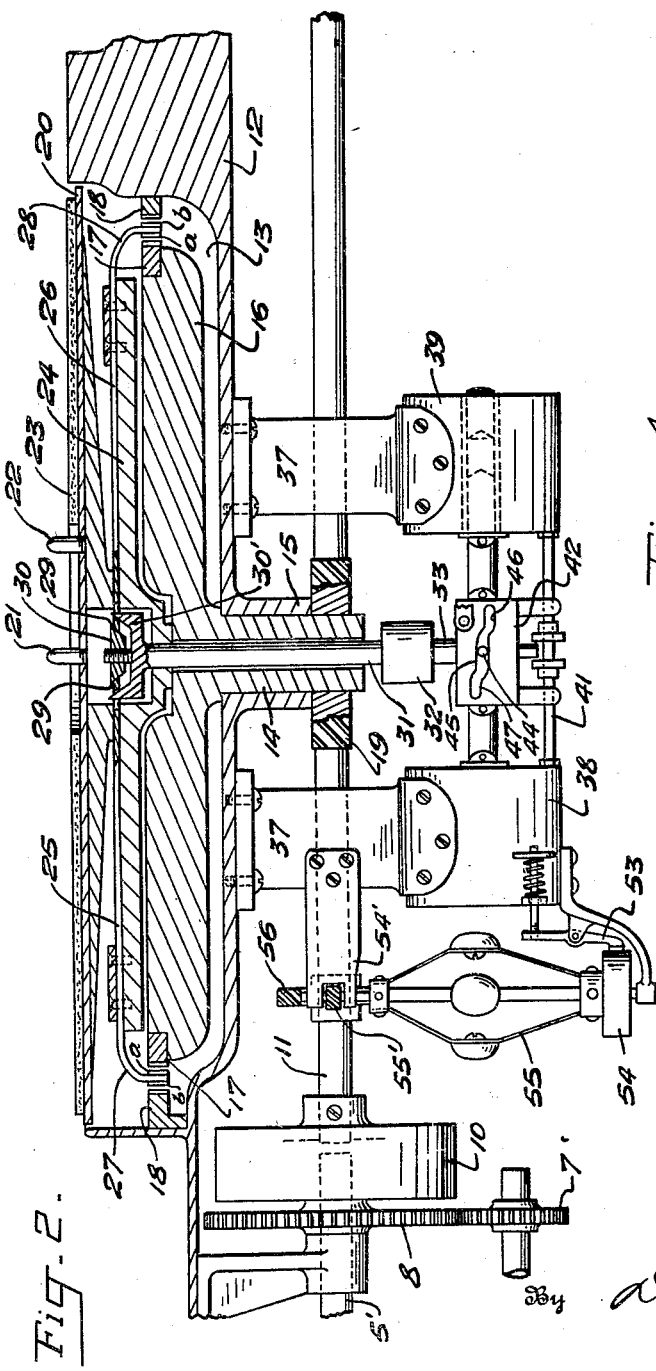
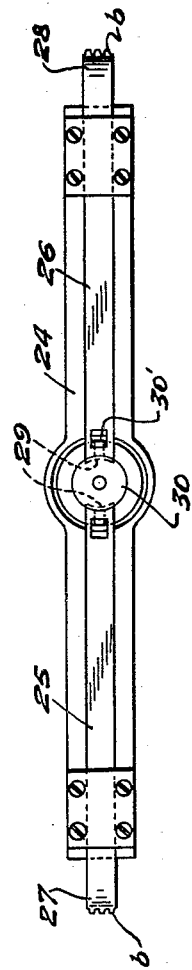
Inventor
CHARLES W. EBELING
By Dan Peter Moore
Attorney

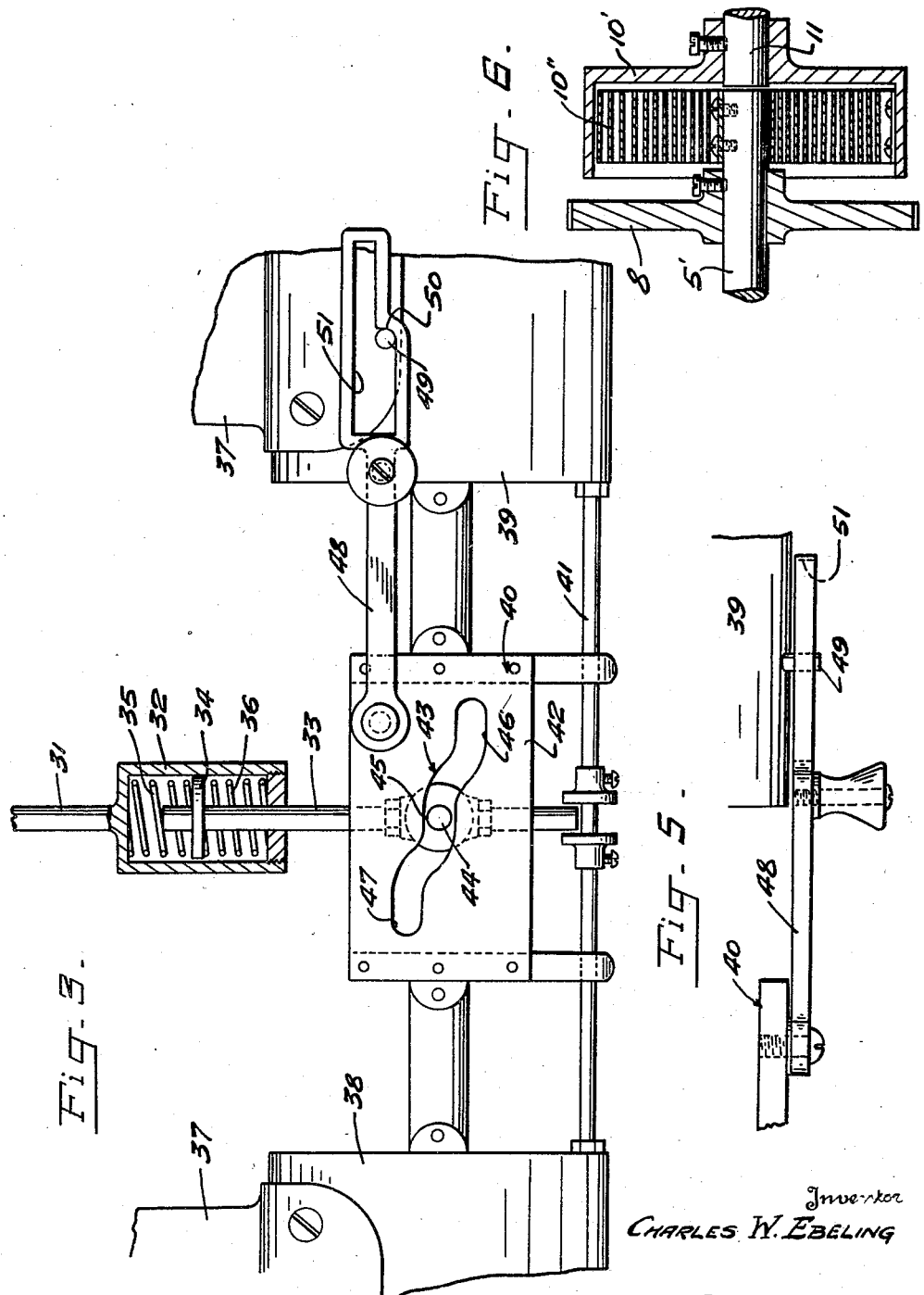

Patented Apr. 28, 1931

1,802,504

UNITED STATES PATENT OFFICE

CHARLES W. EBELING, OF NEW YORK, N. Y., ASSIGNOR TO HARRISON W. ROGERS, INCORPORATED, A CORPORATION OF DELAWARE

SYNCHRONIZED PHOTOGRAPHIC AND SOUND RECORDING AND REPRODUCING MECHANISM

Application filed October 29, 1927. Serial No. 229,599.

This invention relates to synchronized photographic and sound recording and reproducing mechanism, one object of the invention being the provision of a mechanism operated by a single motor whereby the projector may be operated to start the projection of the film while the sound record machine comprising a plural number of record-carrying members is connected automatically through the instrumentality of the film to be alternately started and stopped in conjunction therewith, so that continuous sound reproduction in conjunction with the film, including a series of sound records, may be employed, or a single record may carry a series of different characters of sounds to be started and stopped, according to the act being pictured.

A further object of this invention is the provision of sound reproducing mechanism which can be readily connected to any type of motion picture projector now in use, so as not to interfere with the normal running of pictures and yet at the same time permit synchronized sound and photography at interspersed periods during the performance.

While the words "motion picture projector" and "sound reproducing means" are used throughout the present description, it is intended that in recording, the same will be understood to mean the motion picture camera and electrical sound recording device.

In the accompanying drawings:—

Figure 2 is an enlarged detail view through one member of the sound reproducing machine.

Figure 3 is an enlarged front view of the clutch actuating mechanism for the sound reproducing member.

Figure 4 is a plan view of the double arms and the clutch members.

Figure 5 is a detail view of the locking device for holding the clutch actuator in neutral position.

Figure 6 is a sectional view through the compensating connection between the two sections of the driven shaft.

Figure 1:
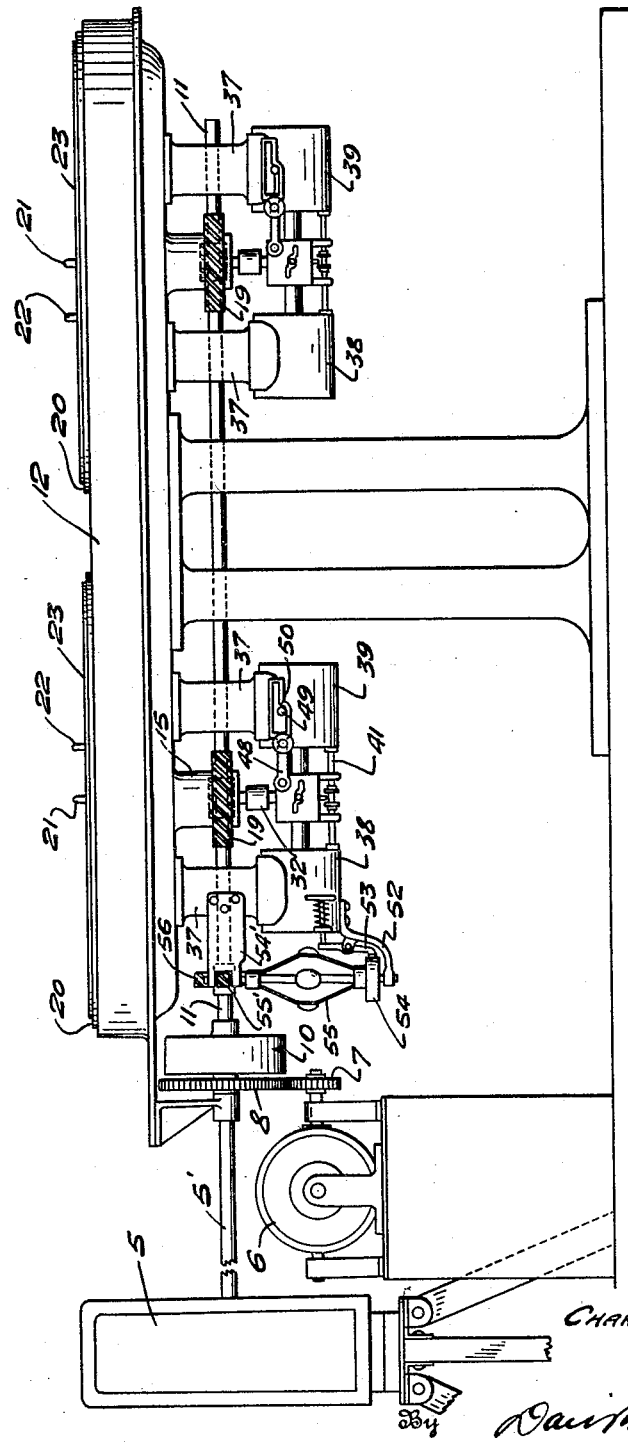
Figure 1 is a view, more or less diagrammatic, showing the complete invention, including the projector and sound reproducing mechanism.

Referring to the drawings, the numeral 5 designates a motion picture projector or camera whose drive shaft 5' is driven by the motor 6 and is also properly connected through the gears 7 and 8 and the spring coupler 10 to the sound reproducing or recording machine drive shaft 11. The member 10 comprises a casing 10' and a spring 10'', the spring being connected to the gear 8 at the inner end, while the outer end is connected to the casing 10', said casing 10' being keyed or connected to the shaft 11. This is provided to take care of the initial inertia of the shaft 5' in starting the mechanism, as will presently appear. The table 12 is provided with two recesses 13, and as the mechanisms mounted in each of the respective recesses 13 are similar, the description of one will suffice for both. The stub shaft 14 is mounted in the boss 15 and carries the relatively heavy wheel or momentum device 16, the same being provided upon its periphery with an exteriorly toothed annulus or ring 17 which is opposed, but in concentric spaced relation, to the fixed internally toothed ring or annulus 18, the teeth being of the same size and pitch as for the purpose hereinafter described. The shaft 11 is geared at all times with the stub shaft 14, as at 19, and is continuously rotated so that the member 16 is also continuously rotated, and thus provides a means to take care of any unevenness that would affect sound reproduction or recording, and this constitutes the member for operating at the proper time the relatively light turn-table 20 which is provided with the centering pin 21 and the stop pin 22 for receiving a disk record (not shown), the upper surface of said platform being, as usual, covered with a sound-deadening felt 23.

Attached to the under side of the turntable is a casing 24 which has mounted therein for radial sliding movement the two arms 25 and 26, the outer curved ends 27 and 28 of which are disposed to lie within the annular space between the two geared members 17 and 18 and are provided with oppositely disposed teeth *a* and *b* to connect, respectively, with either one of these members and thus either to stop and hold the turntable 20 in a fixed position when the teeth *b* engage the annulus 18, or cause the same to rotate with the member 16 when the teeth *a* engage the teeth of the annulus 17. The inner ends of the arms 25 and 26 are each provided with cam faces 29 which normally engage the cams 30 and 30', which, in turn, are operated by the plunger or rod 31 vertically slidable within the stub shaft 14 and non-rotatable when the arms 25 and 26 are inert, or when the teeth *b* and 18 are engaged. This latter rod is provided with a casing 32 at its lower end in which is slidably mounted its operating rod 33 provided with an annular shoulder or disk 34 within the casing 32 and opposed by the two springs 35 and 36. These springs are provided to produce a cushion or resilient connection so that should the respective teeth *a* and *b* not be in exact registration with the teeth of the respective annulii 17 or 18, there could be no damage done to the mechanism.

In order to automatically operate the rods 33 and 31 so as to impart thereto the desired projected or retracted movement or to place them in neutral position, neutral as may be desired, the position being desirable when first starting the machine and placing the first sound records in position, there are provided supports 37 carrying the respective opposed electromagnets 38 and 39, these electromagnets being solenoids and having their cores connected, respectively, to the frame 40 mounted upon the two guide rods 41 supported between the frames of the two magazines. This frame is provided with two plates 42 provided with a longitudinal zigzag slot 43 in which the oppositely extended pin 44 carried by the rod 33 is disposed to ride, the pin, when in the position shown in Figure 3, being in the neutral portion 45 of the slot, and when operated by the magazine 38 to be seated in the connecting portion 46 of the slot, that is, when the rods 33 and 31 are pulled downwardly, to cause the teeth *b* and the annulus 18 to be connected, and thus bolt the turntable 20. When the electromagnet 39 is energized, the frame 40 is pulled to the right, as seen in Figure 3, and the pin 44 caused to ride in the portion 47 of the slot, and thus push the rods 33 and 31 upwardly and retract the arms 25 and 26, and thus place the teeth *a* into engagement with the annulus 17 and thus connect the turntable 20 with the rotating momentum device 16.

In starting the present device, it is desirable to place the parts in the position as shown in Figure 3. This is done through the medium of the hand-operated lever 48 connected to the frame 40 and slidable in either direction. This lever is capable of a slight upward movement, to permit the pin 49 to be placed in contact with the shouldered portion 50 of the slot 51. Thus with the frame 40 to the extreme right position the lever 48 may be raised to permit the pin 49 to be engaged and then the lever is slid to the left until the shoulder 50 and pin 49 engage, to permit the parts to assume the position as shown in Figure 3. The same happens when the lever is elevated and the frame 40 moved from extreme left to center position. When the lever is released, the free end will fall, and thus place the pin in engagement with the shoulder 50, so that when the device is automatically actuated, the pin will ride against the upper wall of the slot and thus not interfere with the movement of the frame 40.

In order to provide a speed-regulating means for the shaft 11, there is mounted on the magnet 38 an arm 52 which carries a resiliently mounted brake-shoe-carrying lever 53 disposed in the path of and to engage the brake wheel 54 of the centrifuge governor 55 whose lower end is mounted in the arm 52 while the upper end is supported in the arm 54' with the worm gear 55' in mesh with the gear 56 on the shaft 11. Thus, by adjusting the lever 53, the tension of the brake lever and the action of the centrifuge device will maintain the desired governed speed in the shaft 11, and, consequently, the turntable actuating momentum devices 16.

These electromagnets 38 and 39, as in my former Patent No. 1,374,913, are controlled, respectively, by the film-actuated switches of the projecting machine, so that at the desired starting point on the film the electromagnet 39 is energized and the turntable connected with the rotating mechanism device, and again at the proper time the next switch would be operated to energize the electromagnet 38 and operated to disconnect the turntable from the momentum device and connect it with the fixed annulus 18. By this means, a film may have a musical or other sound reproducing records interspersed throughout the film, or, where desired, a series of sound records may be operated successively through this mechanism.

What is claimed as new is:—

1. The combination with a motion picture projector, a drive shaft, a prime mover for the drive shaft, a continuously rotatable turntable actuating member connected to the drive shaft, a turntable, a turntable stopping member disposed concentrically and externally of the continuously rotatable member and providing a concentric space between the two, means carried by the turntable and operated from a distant point and movable across said space for connecting the latter either with the stopping means or with the continuously rotatable member whereby the turntable may be alternately moved or stopped, said latter means including two radially movable clutch-carrying members connected to and bodily rotatable with the turntable, and means for retracting and projecting the clutch carrying members.

2. The combination with a motion picture projector, a drive shaft, a prime mover for the drive shaft, a continuously rotatable turntable actuating member connected to the drive shaft, a turntable, a turntable stopping member disposed concentrically and externally of the continuously rotatable member and providing a concentric space between the two, means carried by the turntable and operated from a distant point and movable across said space for connecting the latter either with the stopping means or with the continuously rotatable member whereby the turntable may be alternately moved or stopped, said latter means including two radially movable clutch-carrying members connected to and bodily rotatable with the turntable, a vertically slidable cam actuator for said members, and means controlled from a distant point for imparting movement to said cam actuator.

3. The combination with a motion picture projector, a drive shaft, a prime mover for the drive shaft, a continuously rotatable turntable actuating member connected to the drive shaft, a turntable, a turntable stopping member disposed concentrically and externally of the continuously rotatable member and providing a concentric space between the two, means carried by the turntable and operated from a distant point and movable across said space for connecting the turntable either with the stopping means or with the continuously rotatable member whereby the turntable may be alternately moved or stopped, said last named means including two radially movable clutch-carrying members connected to and bodily rotatable with the turntable, a vertically slidable cam actuator for said clutch carrying members, means controlled from a distant point for imparting said action to said actuator, and a spring cushioning means forming a connection in said actuator whereby any inequalities in the connection of the clutch carrying members with the rotating member or fixed member will be corrected.

4. The combination as set forth in claim 1, characterized by the fact that manually operable means is provided for placing the means carried by the turntable centrally of the concentric space to permit the turntable to be manually rotated.

5. The combination as set forth in claim 2, characterized by the fact that selective means is provided for placing the turntable stopping means within the concentric space to permit the turntable to be manually rotated.

6. The combination as set forth in claim 3, characterized by the fact that selective means is provided for placing the turntable stopping means within the concentric space to permit the turntable to be manually rotated.

7. The combination as set forth in claim 1, characterized by the fact that a manually slidable means located below the turntable is operable to place the stopping means in a neutral position.

8. The combination as set forth in claim 3, characterized by the fact that a manually slidable means is attached to the actuator to place the latter in neutral position with the clutch carrying means free to permit the manually rotation of the turntable.

In testimony whereof, I have hereunto set my hand.

CHARLES W. EBELING.